(12) United States Patent
Nelson

(10) Patent No.: US 6,662,558 B1
(45) Date of Patent: Dec. 16, 2003

(54) VARIABLE DELIVERY CONTROL ARRANGEMENT FOR A PUMP

(75) Inventor: Bryan E. Nelson, Lacon, IL (US)

(73) Assignee: Caterpillar Inc, Peoria, IL (US)

( * ) Notice: Subject to any disclaimer, the term of this patent is extended or adjusted under 35 U.S.C. 154(b) by 6 days.

(21) Appl. No.: 10/188,229

(22) Filed: Jul. 2, 2002

(51) Int. Cl.$^7$ ............................................. F16D 31/02
(52) U.S. Cl. ......................................... 60/443; 60/452
(58) Field of Search ..................... 60/443, 444, 452; 417/213, 270, 307

(56) References Cited

U.S. PATENT DOCUMENTS

| | | | | |
|---|---|---|---|---|
| 4,468,173 A | * | 8/1984 | Dantlgraber ................. | 60/452 |
| 4,938,023 A | * | 7/1990 | Yoshino ...................... | 60/452 |
| 5,515,829 A | | 5/1996 | Wear et al. | |
| 5,546,750 A | * | 8/1996 | Richer ......................... | 60/452 |
| 5,586,869 A | * | 12/1996 | Benckert et al. ............. | 60/452 |
| 6,216,670 B1 | | 4/2001 | Anderson et al. | |

* cited by examiner

Primary Examiner—Edward K. Look
Assistant Examiner—Michael Leslie
(74) Attorney, Agent, or Firm—J. W. Burrows; Alan J. Hickman

(57) ABSTRACT

A variable delivery pump is provided for use in a work system. The variable delivery pump includes a variable delivery control arrangement that uses reduced pressure from the variable delivery pump to control the delivery of fluid from the pump. The reduced pressure is directed to a first port of the variable delivery control arrangement and acts to bias the flow changing mechanism to a maximum position when the work system does not require fluid flow. When the work system needs pressurized fluid, the reduced pressure that is also being directed across a flow restrictor is progressively blocked thus causing a variable valve arrangement to controllably direct reduced pressurized fluid to a second fluid port of the flow changing mechanism in opposition to the pressurized fluid at the first fluid port. In the subject arrangement, small orifices requiring large flows is eliminated. Consequently, the subject control arrangement is not adversely subject to high viscosity oils.

26 Claims, 3 Drawing Sheets

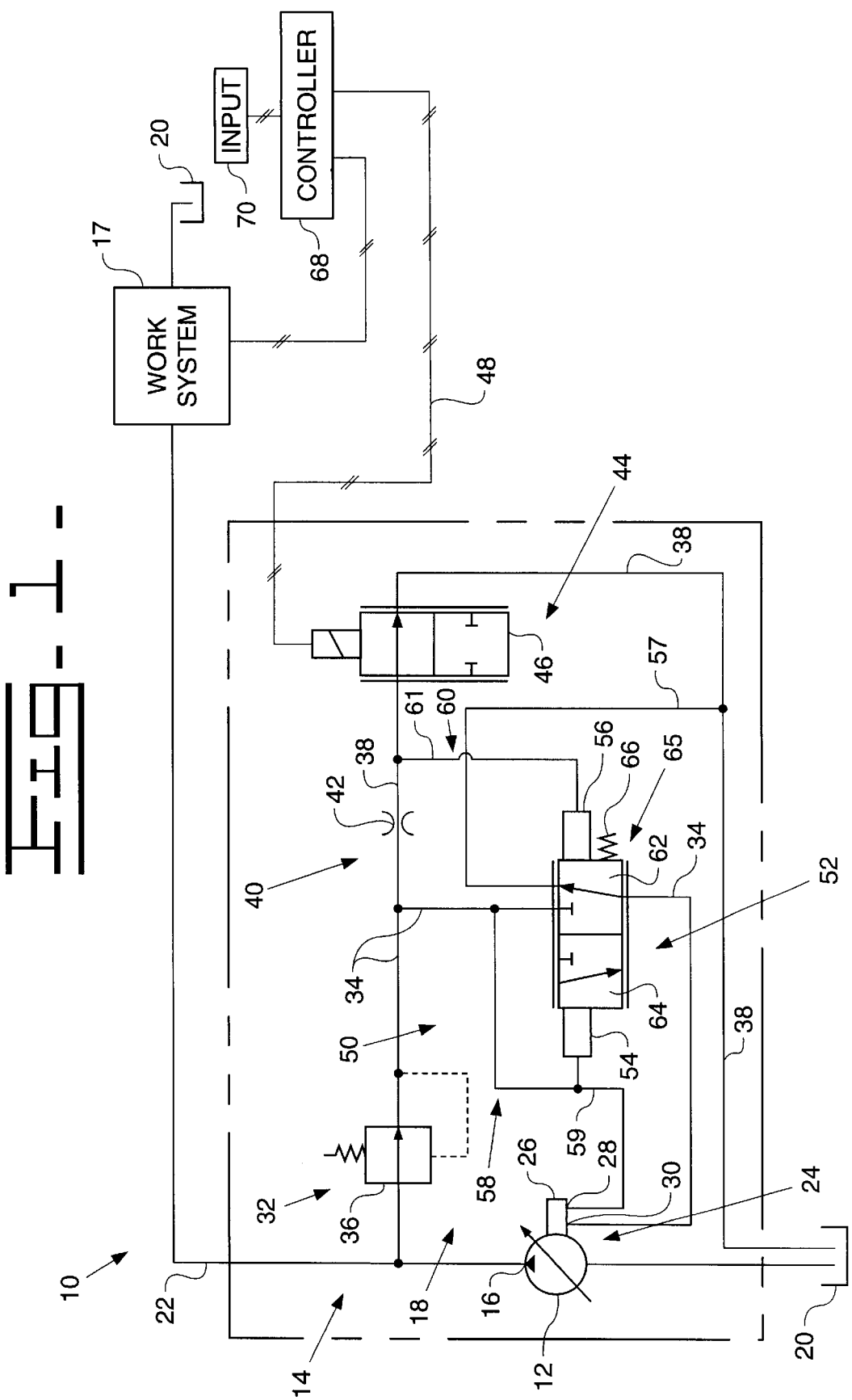

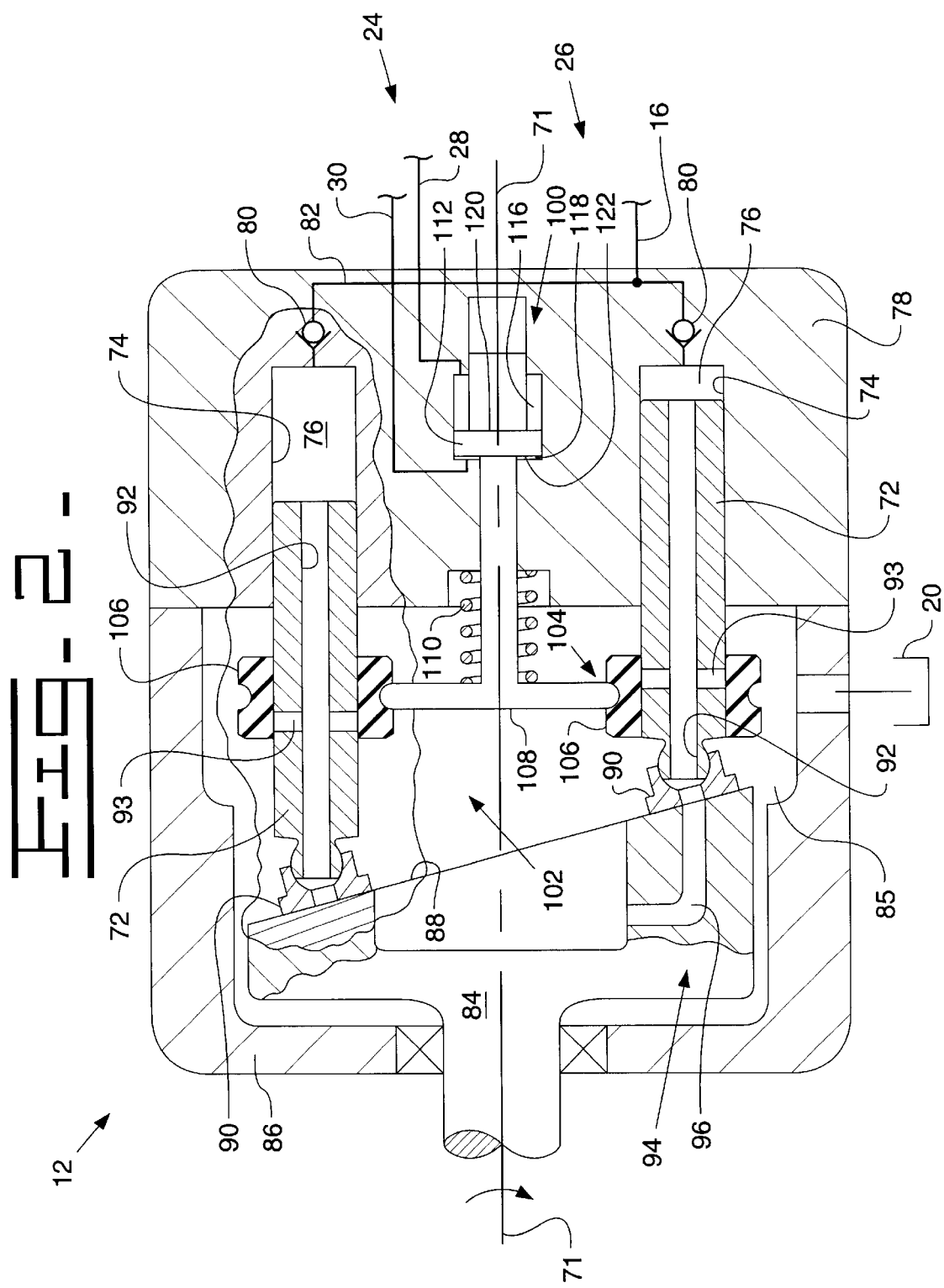

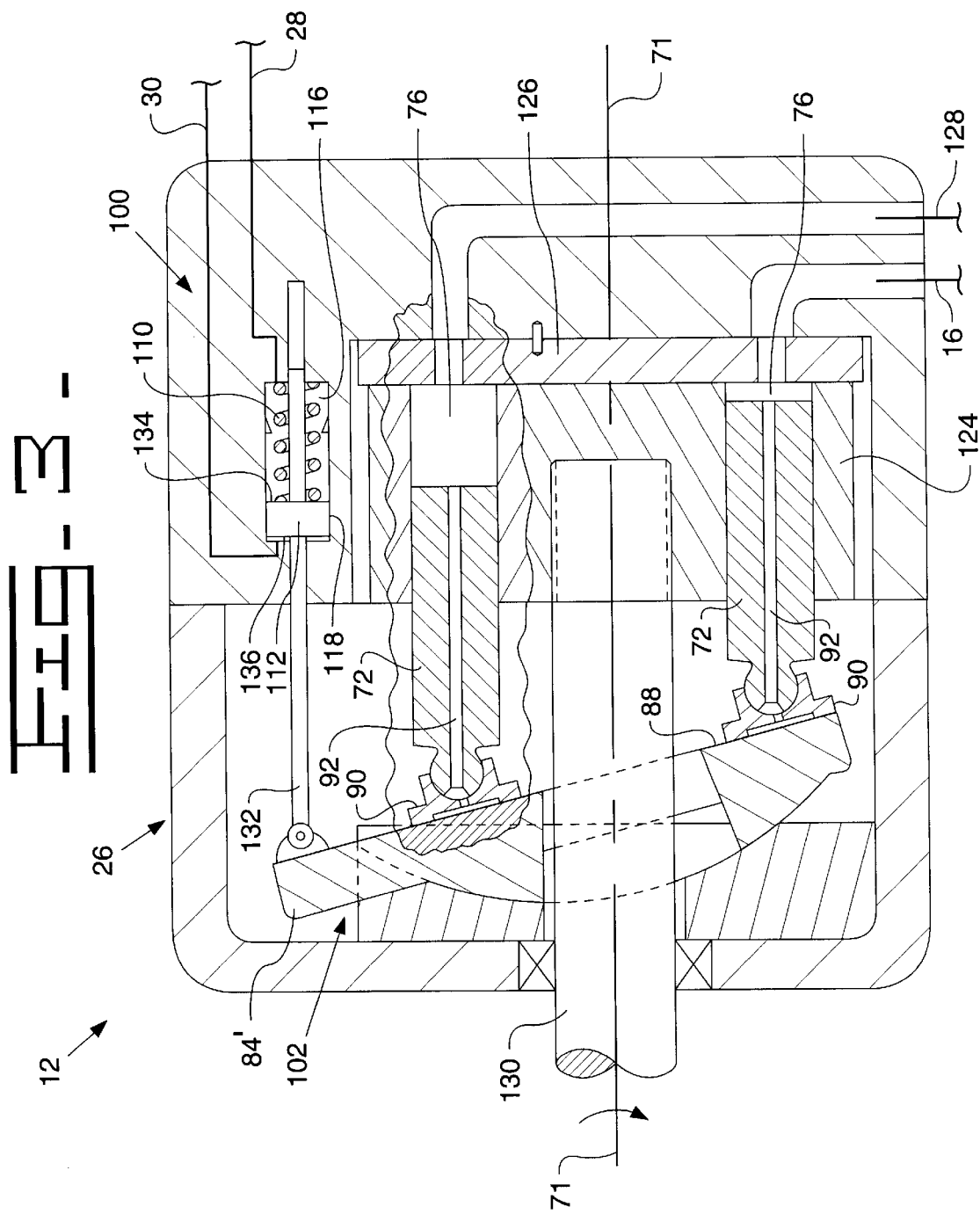

VARIABLE DELIVERY CONTROL ARRANGEMENT FOR A PUMP

TECHNICAL FIELD

This invention relates generally to the control of fluid being delivered from a pump and more specifically to a variable delivery control arrangement for a pump.

BACKGROUND

Variable delivery pumps are well known in the art. Various ones use an adjustable swash plate to control the movement of a plurality of pistons thus controlling the volume of fluid being delivered therefrom. Others use an adjustable sleeve arrangement disposed around each of the pistons that functions to selectively control the volume of fluid being expelled from each of the pumping chambers. These well known variable delivery pumps are effective to control the volume of fluid being delivered from the pump. The various control arrangements used to control the volume of fluid ranges from very simple to very complex. U.S. Pat. No. 5,515,829 which issued to James R. Blass et al. on May 14, 1996 teaches a more complicated direct acting control arrangement for a variable delivery pump having an adjustable swash plate and U.S. Pat. No. 6,216,670 B1 which issued to Michael D. Anderson et al. on Sep. 1, 2001 teaches a somewhat more simplified direct acting control arrangement for a variable delivery pump having an adjustable sleeve arrangement. At times these known variable delivery volume control arrangements are sensitive to changes in oil viscosity. Consequently, when the machine is being started and/or used in cold environments, the response to a needed change in volume may be slower than desired. It is desirable to have a control arrangement that is less susceptible to changes in temperature. The sensitivity of the known control systems to changes in viscosity is many times attributed to large volumes of fluid being passed through small control orifices. Naturally, the thicker the oil the harder it is to force a quantity of oil thereacross in a timely manner.

This invention is directed to overcoming one or more of the problems set forth above.

SUMMARY OF THE INVENTION

In one aspect of the subject invention, a variable delivery control arrangement is provided and operative to control the volume of fluid being delivered to a work system. The variable delivery control arrangement includes a fluid pump having an outlet port and a fluid delivery changing mechanism having first and second fluid ports that are operatively associated with the pump. A pressure reducing valve is connected to the outlet port of the pump in parallel with the work system. An infinitely variable control valve arrangement having first and second end portions is disposed in a control conduit between the pressure reducing valve and the second fluid port of the fluid delivery changing mechanism. A first pilot conduit is connected to the control conduit at a point upstream of the infinitely variable control valve arrangement and to both the first port of the fluid delivery changing mechanism and the first end portion of the infinitely variable control valve arrangement. A low pressure conduit is connected to the control conduit between the pressure reducing valve and the infinitely variable control valve and has a flow restrictor and an electrically controlled proportional valve disposed therein. A second pilot conduit is connected between the second end portion of the infinitely variable control valve arrangement and the low pressure conduit at a point between the flow restrictor and the electrically controlled proportional valve.

In another aspect of the subject invention, a method is provided for controlling the delivery of fluid from an outlet port of a pump to a work system. The method includes the steps of connecting a pressure reducing valve to the outlet port of the pump in parallel with the work system; providing a fluid delivery changing mechanism associated with the pump that has first and second fluid ports; connecting the reduced pressure from the pressure reducing valve to the first fluid port of the fluid delivery changing mechanism; positioning an infinitely variable control valve arrangement having first and second end portions between the reduced pressure of the pressure reducing valve and the second fluid port of the fluid delivery changing mechanism to control the flow of reduced pressure fluid to the second fluid port; connecting a low pressure conduit having a flow restrictor therein to the reduced pressure from the pressure reducing valve; positioning an electrically controlled proportional valve in the low pressure conduit downstream of the flow restrictor; and connecting the reduced pressure from the pressure reducing valve to the first end portion of the infinitely variable control valve arrangement and connecting the second end portion thereof to the low pressure conduit between the flow restrictor and the electrically controlled proportional valve.

BRIEF DESCRIPTION OF THE DRAWINGS

FIG. 1 is a schematic representation of a pump and a work system incorporating an embodiment of the subject invention;

FIG. 2 is a diagrammatic representation of an embodiment of a pump that utilizes the subject invention; and FIG. 3 is a diagrammatic representation of another embodiment of a pump that utilizes the subject invention.

DETAILED DESCRIPTION

Referring to FIG. 1 of the drawings, a fluid system 10 is illustrated. The fluid system 10 includes a pump 12 having a variable delivery control means 14 for controlling the volume of fluid being delivered from an outlet 16 of the pump 12 to a work system 17. The delivery control means 14 includes a variable delivery control arrangement 18 disposed therein that is operative to control the volume of fluid being delivered to the outlet port 16 of the pump 12. The pump 12 receives fluid from a reservoir 20 and delivers pressurized fluid through a supply conduit 22 to the work system 17 in a conventional manner.

The pump 12 has a means 24 for changing the delivery of the fluid from the pump 12 associated therewith. The delivery changing means 24 includes a fluid delivery changing mechanism 26 (hereafter referred to as 'the changing mechanism'). The changing mechanism 26 has first and second fluid ports 28,30 associated therewith.

A means 32 for reducing the pressure of the fluid from the pump 12 to the changing mechanism 26 is disposed in a control conduit 34. The control conduit 34 is connected to the supply conduit 22 between the pump 12 and the work system 17. Consequently, the pressure reducing means 32 is connected to the pump 12 in parallel with the work system 17. The pressure reducing means 32 includes a pressure reducing valve 36 disposed in the control conduit 34.

A low pressure conduit 38 is connected to the control conduit 34 at a location downstream of the pressure reducing valve 36 and to the reservoir 20. A means 40 for restricting flow downstream of the pressure reducing valve 36 is disposed in the low pressure conduit 38. The flow restricting means 40 includes a flow restrictor 42.

A proportional valve means 44 for controlling fluid flow through the low pressure conduit 38 is provided and disposed in the low pressure conduit 38. The proportional valve means 44 includes an electrically controlled proportional valve 46 (hereafter referred to as 'the proportional valve'). The proportional valve 46 is selectively movable from a flow passing position towards a flow blocking position in response to receipt of an electrical signal through an electrical line 48.

An infinitely variable valve means 50 for controlling fluid flow between the pressure reducing valve means 38 and the second fluid port 30 of the fluid changing means 24 is provided and disposed in the control conduit 34. The infinitely variable valve means 50 includes an infinitely variable control valve arrangement 52 (hereafter referred to as 'the variable valve arrangement'). The variable valve arrangement 52 has first and second end portions 54,56. An exhaust conduit 57 connects the variable valve arrangement 52 with the reservoir 20 through the low pressure conduit 38.

A first pilot conduit means 58 is provided and includes a first pilot conduit 59 connected to the control conduit 34 downstream of the pressure reducing valve 36 and connected to both the first end portion 54 of the variable valve arrangement 52 and to the first fluid port 28 of the changing mechanism 26. A second pilot conduit means 60 is provided and includes a second pilot conduit 61 connected between the second end portion 56 of the variable valve arrangement 52 and the low pressure conduit 38 at a point between the flow restrictor 42 and the proportional valve 44.

The variable valve arrangement 52 of the subject embodiment is a two position, three way valve and is movable between first and second operative positions 62,64 and is biased to the first operative position by a biasing means 65 that includes a biasing mechanism 66 disposed at the second end portion 58 thereof. The variable valve arrangement 52 is also urged towards its first operative position by pressurized fluid in the second pilot conduit 61 acting on the second end portion 56 thereof. The variable valve arrangement 52 is movable towards its second operative position in response to pressurized fluid in the first pilot conduit 59 acting on the first end portion 54 thereof.

At the first operative position 62 of the variable valve arrangement 52, flow through the control conduit 34 is blocked from the second fluid port 30 of the changing mechanism 26 and the second fluid port 30 is in fluid communication with the reservoir 20 through the exhaust conduit 57. At the second operative position 64, fluid in the control conduit 34 is in open communication with the second fluid port 30 and the exhaust conduit 57 is blocked from the second fluid port 30.

A controller 68 is provided and operates in response to an input 70 to control the work system 17 and the proportional valve means 44 of the changing mechanism 26. The controller 68 can be any well known micro-processor and the input 70 is normally controlled by an operator.

Referring to FIG. 2, a diagrammatic representation of one embodiment of the pump 12 of FIG. 1 is illustrated. Like elements have like element numbers. The pump 12 of the subject embodiment is a variable delivery, fixed displacement pump. A reference axis 71 is defined in the pump 12 and extends therethrough. The pump 12 has a plurality of pistons 72 that are slideably disposed in corresponding piston bores 74 to form corresponding pressure chambers 76. The plurality of piston bores 74 and corresponding pressure chambers 76 are defined in a head portion 78 and evenly disposed about and parallel with the reference axis 71. Each of the pressure chambers 76 are in communication with the outlet port 16 of the pump through respective check valves 80 and a conduit 82.

A rotating, fixed angle swash plate 84 is disposed in a cavity 85 within a body portion 86 of the pump 12 and rotates about the reference axis 71. The swash plate 84 has an inclined surface 88 that is angled with respect to the reference axis 71. In the subject embodiment, the cavity 85 is in communication with the reservoir 20. Each piston of the plurality of pistons 72 has a corresponding piston shoe 90 pivotally attached in a well known manner to the end of the respective piston 72 that is opposite the respective pressure chambers 76. Each of the respective pistons 72 and piston shoes 90 has passageways 92 defined therein in order for the respective pressure chambers 76 to be in continuous, free communication with the surface 88 of the swash plate 84. Likewise, each of the pistons 72 has a transverse passageway 93 define therein along the piston 72 at a predetermined distance from the respective pressure chambers 76. The respective transverse passageways 93 intersect with the respective passageways 92.

An inlet valving arrangement 94 is defined in the swash plate 84 and includes a first passageway 96 that is in continuous communication with the reservoir 40 through the cavity 85 in the body portion of the pump 12 and in selective communication with a portion of the piston shoes 90 and pistons 72 as the swash plate 84 rotates. The inlet valving arrangement 94 serves as a fluid inlet to the pump 12. As illustrated in FIG. 2, the piston 72 at the bottom thereof is at its top center position (TDC) and the piston 72 at the top is shown out of its plane but is near the bottom dead center position (BDC). The piston 72 at the top of the Figure is shown out of plane for simplicity and illustrative purposes.

The changing mechanism 26 of FIG. 2 includes a fluid actuator assembly 100 and a flow changing mechanism 102. The flow changing mechanism 102 is a sleeve metering arrangement 104. The sleeve metering arrangement 104 includes respective sleeves 106 that are slideably disposed about the corresponding pistons 72 and maintained in a selected position by a sleeve actuator shaft 108. The sleeve actuator shaft 108 operates to move all of the sleeves 106 at the same time along a line parallel to the reference axis 71. Movement of the respective sleeves 106 along the corresponding piston 76 acts to open the respective transverse passageways 93 and therefore the respective pressure chambers 76 to the reservoir 20 through the cavity 85 or to block fluid flow from escaping from the respective passageways 92. A biasing mechanism 110 urges the sleeve actuator shaft 108 and respective sleeves 106 towards a position to block the flow of fluid from the respective transverse passageways 93 and thus establish a maximum flow position.

The fluid actuator assembly 100 includes an actuator piston 112 disposed in an actuator piston bore 114. The actuator piston 112 is connected to the sleeve actuator shaft 108 and defines first and second pressure chambers 116,118 in the actuator piston bore 114. The first pressure chamber 116 is in communication with the first fluid port 28 and has a first effective pressure acting surface 120. The second pressure chamber 118 is in communication with the second fluid port 30 and has a second effective pressure acting surface 122. In the subject embodiment, the first pressure acting surface 120 is smaller than the second effective pressure acting surface 122.

Referring to FIG. 3, a diagrammatic representation of another embodiment of the pump 12 is illustrated. Like elements from FIGS. 1 and 2 have like element numbers. The pump 12 of the subject embodiment is a variable displacement pump having the plurality of pistons 72 slideably disposed in a plurality of piston bores 74 to define respective pressure chambers 76 in a rotating barrel 124. The respective piston shoes 90 are pivotally attached to each of the pistons 72 in a well known manner. The swash plate 84' of the subject embodiment does not rotate like that of FIG. 2. The respective piston shoes 90 are in sliding contact with the inclined surface 88.

The barrel 124 is in mating contact with a fixed porting plate 126. It is recognized that the porting plate 126 could be incorporated in the head portion 78 without departing from the essence of the subject invention. In a well known manner, the porting plate 126 functions to controllably connect the respective pressure chambers 76 with an inlet port 128 and the outlet port 16. The passageways 92 that are defined in the respective piston 72 are smaller and function only to provide lubricating fluid to the piston shoes 90 and the inclined surface 88. A driving shaft 130 is operatively coupled with the barrel 124 and functions to turn the barrel 124 and the plurality of pistons 72 relative to the porting plate 126.

The flow changing mechanism 106 of FIG. 3 is the pivotal swash plate 84'. The swash plate 84' of the subject embodiment does not rotate but it does pivots relative to the reference axis 71 which changes the length of travel of the respective pistons 72 between a maximum flow rate position and a minimum flow rate position.

The fluid actuator assembly 100 has the actuator piston 112 that is connected to the swash plate 84' by an actuator shaft 132. Likewise, the fluid actuator assembly 100 has the first pressure chamber 116 that is in communication with the first fluid port 28 thereof and the second pressure chamber 118 that is in fluid communication with the second fluid port 30. The first pressure chamber 116 has a first effective pressure surface 134 that is equal to the effective pressure acting surface 136 within the second pressure chamber 118. The biasing mechanism 110 urges the swash plate 84' towards its maximum flow position.

It is recognized that various types of pumps, such as vane type, gear type or others, could be used without departing from the essence of the subject invention.

INDUSTRIAL APPLICABILITY

The operation of a fluid system 10, as set forth in FIG. 1 and using the pump 12 of FIG. 2, will be described first. Upon initial startup of the fluid system 10, the pump 12 would be operating at maximum flow delivery to the work system 17. If the operator has not made an input 70 to the controller 68, no flow is needed. Consequently, the pressure in the supply conduit 22 rises quickly. Simultaneously, the pressurized fluid in the supply conduit 22 is directed across the reducing valve 36 to establish a predetermined pressure level in the control conduit 34. The reduced pressure in the control conduit 34 is directed through the first pilot conduit 59 to the first fluid port 28 of the fluid actuator assembly 100. The pressurized fluid at the first fluid port 28 acts on the first effective pressure acting surface 120 urging the sleeve actuator shaft 108 towards the maximum flow delivery position. At the same time, the pressurized fluid in the first pilot conduit 59 acts on the first end portion 54 of the variable valve arrangement 52 urging it in a direction against the bias of the biasing mechanism 66.

The pressurized fluid in the control conduit 34 is also directed across the flow restrictor 42 to the proportional valve 46 and to the second end portion 56 of the variable valve arrangement 52 urging the variable valve arrangement 52 towards its second position. Since the proportional valve 46 is in its flow passing position, the pressurized fluid in the second pilot conduit 61 is substantially lower since the low pressure conduit 38 is connected with the reservoir 20. Since the pressure of the fluid in the first pilot conduit 59 is higher, the force thereof will overcome the force of the biasing mechanism 66 and force the variable valve arrangement 52 towards its second operative position 64. As the pressure of the fluid in the control conduit 34 is directed to the second fluid port of the changing mechanism 24, the force generated by the pressurized fluid acting on the second, larger effective area 118 forces the actuator piston 112 and the sleeve actuator shaft towards the right as viewed in FIG. 2. This rightward movement progressively opens the transverse passageways 93 which permits portions of the fluid within the respective pressure chambers 76 to be vented to the reservoir. As long as there is no input to the controller 68, the pump 14 is operating to deliver a minimum volume of fluid to the supply conduit 22. This minimum volume of fluid will be sufficient to make up any leakage in the fluid system and to maintain any needed standby pressure.

Once the operator initiates a command to the input 70, the controller functions to operate the work system 17 and simultaneously, the controller progressively closes the proportional valve 46. The degree of input by the operator to do work determines how much pump flow is needed. As the proportional valve 46 begins to meter the fluid flow thereacross, the pressure of the fluid in the second pilot conduit 61 increases. Once the bias of the biasing mechanism 66 plus the force generated by the pressure of the fluid in the second pilot conduit 61 reaches a predetermined magnitude, the variable valve arrangement 46 moves towards the left as viewed in FIG. 1. Since the pressurized fluid at the second fluid port 30 is now being vented to the low pressure conduit 38 through the exhaust conduit 57, the force of the pressurized fluid acting on the first effective area 120 is sufficient to move the sleeve actuator shaft 108 and the respective sleeves 106 towards the left as viewed in FIG. 2 thus increasing the delivery of fluid to the outlet port 16. If the operator desires more work from the work system 17, more of the pressurized fluid in the second conduit 60 is vented to the reservoir 20 across the proportional valve 46 and the increase in pressure acting on the first effective pressure area 120 moves the sleeve metering arrangement 104 further to the left, thus further increasing the flow delivery at the outlet port 16. The more that the proportional valve 46 is moved towards its flow passing position, the more flow the pump 12 will deliver to the outlet port 16.

The operation of a fluid system 10, as set forth in FIG. 1 and using the pump 12 of FIG. 3, will be described next. The operation of the fluid system 10 using the pump 12 of FIG. 3 is basically the same as that with respect to use of the fluid pump 12 in the fluid system 10. Upon startup of the fluid system 10 with no input 70 by the operator, the pump 12 is at maximum displacement. Like that with respect to FIG. 2, the pressurized fluid acting on the first effective area 134 of the actuator piston 112 creates a force greater than the force created by the low pressure in the second pilot conduit 61 acting against the second effective area 136 of the actuator piston 112. In this embodiment, the first and second effective areas 134,136 are the same size. It is recognized that the areas could be different. Likewise, it is recognized that the first and second effective areas 120,122 of the pump 112 of FIG. 2 could be of equal areas.

From the foregoing, it should be readily apparent that the subject variable delivery control arrangement 18 for a pump 12 is simple in construction and is less sensitive to operating in cold temperatures. This is true sense there are no small control orifices that must handle a large volume of flow. Likewise, the variable valve arrangement 52 is held in its flow passing position by pressurized fluid when the work system 10 is not requiring pressurized fluid. This makes the variable valve arrangement 52 more responsive to changes in flow requirements. The one orifice of the subject invention handles only a small volume of fluid. Consequently, it is not adversely subject to the detrimental effects of higher viscosity oil.

Other aspects, objects and advantages of this invention can be obtained from a study of the drawings, the disclosure and the appended claims.

What is claimed is:

1. A variable delivery control arrangement operative to control the volume of fluid being delivered to a work system, comprising:
    a fluid pump having an outlet port;
    a fluid delivery changing mechanism operatively associated with the pump, the fluid delivery changing mechanism has first and second fluid ports;
    a pressure reducing valve connected to the outlet port of the pump in parallel with the work system;
    an infinitely variable control valve arrangement disposed in a control conduit between the pressure reducing valve and the second fluid port of the fluid delivery changing mechanism, the infinitely variable control valve arrangement has first and second end portions;
    a first pilot conduit connected to the control conduit at a point upstream of the infinitely variable control valve arrangement and to both the first port of the fluid delivery changing mechanism and the first end portion of the infinitely variable control valve arrangement;
    a low pressure conduit connected to the control conduit between the pressure reducing valve and the infinitely variable control valve;
    an electrically controlled proportional valve disposed in the low pressure conduit;
    a flow restrictor disposed in the low pressure conduit upstream of the electrically controlled proportional valve; and
    a second pilot conduit connected between the second end portion of the infinitely variable control valve arrangement and the low pressure conduit at a point between the flow restrictor and the electrically controlled proportional valve.

2. The variable delivery control arrangement of claim 1 including a biasing mechanism disposed at the second end portion of the infinitely variable control valve arrangement.

3. The variable delivery control arrangement of claim 1 wherein the fluid delivery changing mechanism has a flow changing mechanism operatively connected to a fluid actuator assembly, the first and second fluid ports are operatively connected to opposite ends of the fluid actuator assembly.

4. The variable delivery control arrangement of claim 3 wherein the flow changing mechanism is movable between minimum and maximum flow delivery positions and a biasing mechanism urges the flow changing mechanism towards the maximum flow delivery position.

5. The variable delivery control arrangement of claim 4 wherein the fluid actuator assembly has first and second opposed effective pressure acting surfaces, the first pressure acting surface is in operative communication with the first port thereof and the second pressure acting surface is in operative communication with the second port thereof.

6. The variable delivery control arrangement of claim 5 wherein the area of the first pressure acting surface is smaller than the area of the second pressure acting surface.

7. The variable delivery control arrangement of claim 5 wherein the flow changing mechanism is a sleeve metering arrangement.

8. The variable delivery control arrangement of claim 5 wherein the flow changing mechanism is a swash plate arrangement.

9. The variable delivery control arrangement of claim 1 wherein the infinitely variable control valve arrangement is a two position, three way valve arrangement and an exhaust conduit is connected to the infinitely variable control valve arrangement and to the low pressure conduit at a point downstream of the electrically controlled proportional valve.

10. The variable delivery control arrangement of claim 9 wherein the infinitely variable control valve arrangement is biased to a first position at which the pressure reducing valve is blocked from the second port of the flow delivery changing mechanism and the second port thereof is connected to the low pressure conduit downstream of the electrically controlled proportional valve and the infinitely variable control valve arrangement is movable towards a second position at which the pressure reducing valve is connected to the second port of the flow delivery changing mechanism.

11. The variable delivery control arrangement of claim 1 wherein the electrically controlled proportional valve is a two position valve that is normally open and is movable towards its closed position in response to an electrical signal.

12. The variable delivery control arrangement of claim 1 in combination with a work system that receives pressurized fluid from the pump and a controller that is operative to control the flow delivery of the pump in response to the requirements of the work system.

13. A method of controlling the delivery of fluid from an outlet port of a pump to a work system, comprising:
    connecting a pressure reducing valve to the outlet port of the pump in parallel with the work system;
    providing a fluid delivery changing mechanism associated with the pump that has first and second fluid ports;
    connecting the reduced pressure from the pressure reducing valve to the first fluid port of the fluid delivery changing mechanism;
    locating an infinitely variable control valve arrangement having first and second end portions between the reduced pressure of the pressure reducing valve and the second fluid port of the fluid delivery changing mechanism to control the flow of reduced pressure fluid to the second fluid port;
    connecting a low pressure conduit having a flow restrictor therein to the reduced pressure from the pressure reducing valve;
    locating an electrically controlled proportional valve in the low pressure conduit downstream of the flow restrictor; and
    connecting the reduced pressure from the pressure reducing valve to both the first fluid port and the first end portion of the infinitely variable control valve arrangement and connecting the second end portion thereof to the low pressure conduit at a location between the flow restrictor and the electrically controlled proportional valve.

14. The method of claim 13 including the step of connecting the infinitely variable control valve arrangement to the low pressure conduit downstream of the electrically controlled proportional valve.

15. The method of claim 14 including the step of providing a biasing mechanism at the second end portion of the infinitely variable control valve arrangement.

16. The method of claim 15 including the step of providing a flow changing mechanism operatively connected to a fluid actuator assembly in the step of providing a fluid delivery changing mechanism.

17. The method of claim 16 including the steps of providing opposed effective pressure acting areas within the fluid actuator assembly that are unequal in size and connecting the smaller of the effective pressure acting areas to the first fluid port of the fluid delivery changing mechanism.

18. A variable delivery control means for controlling the volume of fluid being delivered to a work system, comprising:

a fluid pump having an outlet port;

means for changing the delivery of the fluid from outlet port of the fluid pump, the changing means includes first and second fluid ports;

means for reducing the pressure of the fluid from the pump to a control conduit, the pressure reducing means being connected in parallel with the work system;

a low pressure conduit connected to the control conduit downstream of the reducing means;

means for restricting flow downstream of the pressure reducing means, the restricting means being disposed in the low pressure conduit;

infinitely variable valve means for controlling fluid flow between the pressure reducing means and the second fluid port of the flow changing means, the infinitely variable valve means has first and second end portions and is disposed in the control conduit;

a proportional valve means for controlling fluid flow through the low pressure conduit, the proportional valve means being disposed in the low pressure conduit at a location downstream of the pressure reducing means;

a first pilot conduit means for directing fluid flow from the reducing means to both the first end portion of the infinitely variable valve means and the second port of the flow changing means; and a second pilot conduit means for directing fluid flow between a point downstream of the restricting means to the second end portion of the infinitely variable valve.

19. The variable delivery control means of claim 18 wherein the changing means includes a flow changing mechanism that is operatively connected to a fluid actuator assembly.

20. The variable delivery control means of claim 19 wherein the first and second fluid ports are operatively connected to opposite ends of the fluid actuator assembly.

21. The variable delivery control means of claim 19 wherein the fluid actuator assembly has first and second opposed effective pressure acting surfaces, the first pressure acting surface is in operative communication with the first fluid port and the second pressure acting surface is in operative communication with the second fluid port.

22. The variable delivery control means of claim 21 wherein the area of the first pressure acting surface is smaller than the area of the second pressure acting surface.

23. The variable delivery control means of claim 18 wherein the infinitely variable valve means is biased to a first position at which the pressure reducing means is blocked from the second fluid port of the flow changing means and the second fluid port thereof is connected to the low pressure conduit downstream of the proportional valve means and the infinitely variable valve means is movable towards a second position at which the pressure reducing means is connected to the second port of the flow changing means.

24. The variable delivery control means of claim 18 including a biasing means disposed at the second end portion of the infinitely variable control valve means.

25. The variable delivery control means of claim 18 wherein the infinitely variable control valve means is a two position, three way valve and an exhaust conduit is connected to the infinitely variable control valve mean and to the low pressure conduit at a point downstream of the proportional valve means.

26. The variable delivery control means of claim 25 wherein the infinitely variable control valve means is biased to a first position at which the pressure reducing valve means is blocked from the second port of the flow delivery changing means and the second port thereof is connected to the low pressure conduit downstream of the proportional valve means and the infinitely variable control valve means is movable towards a second position at which the pressure reducing valve means is connected to the second port of the flow delivery changing means.

* * * * *